(12) United States Patent
Zheng et al.

(10) Patent No.: US 11,783,474 B1
(45) Date of Patent: Oct. 10, 2023

(54) DEFECTIVE PICTURE GENERATION METHOD AND APPARATUS APPLIED TO INDUSTRIAL QUALITY INSPECTION

(71) Applicant: CHANGZHOU MICROINTELLIGENCE CO., LTD., Changzhou (CN)

(72) Inventors: Zheng Zheng, Changzhou (CN); Zhengyi Pan, Changzhou (CN); Dawei Hou, Changzhou (CN)

(73) Assignee: CHANGZHOU MICROINTELLIGENCE CO., LTD., Changzhou (CN)

( * ) Notice: Subject to any disclaimer, the term of this patent is extended or adjusted under 35 U.S.C. 154(b) by 0 days.

(21) Appl. No.: 18/033,565

(22) PCT Filed: Aug. 23, 2022

(86) PCT No.: PCT/CN2022/114071
§ 371 (c)(1),
(2) Date: Apr. 25, 2023

(87) PCT Pub. No.: WO2023/082760
PCT Pub. Date: May 19, 2023

(30) Foreign Application Priority Data

Nov. 15, 2021 (CN) .......................... 202111344706.6

(51) Int. Cl.
*G06K 9/00* (2022.01)
*G06T 7/00* (2017.01)

(52) U.S. Cl.
CPC .... *G06T 7/001* (2013.01); *G06T 2207/20081* (2013.01); *G06T 2207/20084* (2013.01)

(58) Field of Classification Search
CPC ........... G06T 7/001; G06T 2207/20081; G06T 2207/20084
See application file for complete search history.

(56) References Cited

U.S. PATENT DOCUMENTS

2003/0081215 A1* 5/2003 Kumar ............... G01N 21/8983
356/431
2018/0328855 A1* 11/2018 Kido .................. G01B 11/2509
(Continued)

FOREIGN PATENT DOCUMENTS

CN 110554047 A 12/2019
CN 111024708 A 4/2020
(Continued)

OTHER PUBLICATIONS

Wang Jian, et al., Recognition of Defects in Pins Based on Generative Adversarial Network and RetinaNet, Journal of South China University of Technology (Natural Science Edition), 2020, pp. 1-8, vol. 48, No. 2.
(Continued)

*Primary Examiner* — Samir A Ahmed
(74) *Attorney, Agent, or Firm* — Bayramoglu Law Offices LLC

(57) ABSTRACT

A defective picture generation method applied to industrial quality inspection and a defective picture generation apparatus applied to industrial quality inspection are provided. The method includes: acquiring a first workpiece picture set with defects and a second workpiece picture set without defects; determining a defect annotation picture corresponding to each first workpiece picture in the first workpiece picture set; determining a feature value of each second workpiece picture in the second workpiece picture set; training a pix2pixHD network based on the first workpiece pictures, the second workpiece pictures, the defect annotation pictures and the feature values; acquiring a target defect annotation picture from the defect feature database according to the desired defect type; acquiring a target feature value from the picture feature database according to the desired picture type; and inputting the target defect annota-
(Continued)

tion picture and the target feature value into the trained generator.

10 Claims, 3 Drawing Sheets

(56) References Cited

U.S. PATENT DOCUMENTS

| | | | |
|---|---|---|---|
| 2018/0330489 A1* | 11/2018 | Kido | G06T 7/0004 |
| 2020/0134804 A1 | 4/2020 | Song et al. | |
| 2021/0364447 A1* | 11/2021 | Naruse | G06V 10/772 |
| 2022/0084182 A1* | 3/2022 | Ohya | G06N 20/00 |
| 2022/0164938 A1* | 5/2022 | Shiki | G06V 10/96 |

FOREIGN PATENT DOCUMENTS

| | | | |
|---|---|---|---|
| CN | 111127454 A | 5/2020 | |
| CN | 111507945 A | 8/2020 | |
| CN | 112017182 A | 12/2020 | |
| CN | 112528975 A | 3/2021 | |
| CN | 113011480 A | 6/2021 | |
| CN | 113793333 A | 12/2021 | |

OTHER PUBLICATIONS

Dawei Hou, et al., From AI quality inspection robot to digital factory driven by quality big data, 2020, pp. 74-83.
Shuanlong Niu, et al., Defect Image Sample Generation With GAN far Improving Defect Recognition, IEEE Transactions on Automation Science and Engineering, 2020, pp. 1611-1622, vol. 17, No. 3.

* cited by examiner

DEFECTIVE PICTURE GENERATION METHOD AND APPARATUS APPLIED TO INDUSTRIAL QUALITY INSPECTION

CROSS REFERENCE TO THE RELATED APPLICATIONS

This application is the national phase entry of International Application No. PCT/CN2022/114071, filed on Aug. 23, 2022, which is based upon and claims priority to Chinese Patent Application No. 202111344706.6, filed on Nov. 15, 2021, the entire contents of which are incorporated herein by reference.

TECHNICAL FIELD

The present invention relates to the technical field of industrial quality inspection, and in particular to a defective picture generation method applied to industrial quality inspection and a defective picture generation apparatus applied to industrial quality inspection.

BACKGROUND

At present, the industrial quality inspection scheme mainly includes a manual quality inspection mode and a machine vision quality inspection mode. When the manual quality inspection is adopted, there are the following main problems: the quality of detection is very dependent on workers themselves, and factors such as work experience, fatigue and misoperation may lead to missed and false detections, and meanwhile, with the continuous increase of labor costs in these years, the cost of quality inspection is also rising. In addition, with the continuous improvement of deep learning machine vision technology, the machine vision technology gradually occupies a greater proportion in industrial quality inspection. The adoption of machine vision for inspection has become an important means, and has gradually become the preferred scheme in industrial quality inspection.

As deep learning technology becomes more and more important in the application of industrial quality inspection, a significant problem arises: the deep learning technology can ensure that the generated model has the capability of meeting the quality inspection requirements only if a large number of actual defective samples are adopted in model training. However, the generation of defective samples in actual industrial production is a small probability event, which results in a serious shortage of samples used to support model training.

For this reason, in the related art, a defective sample picture is generated by a picture generation technology such as generative adversarial network (GAN). However, the defective sample pictures generated by this method are often blurred, have an insufficient definition, and cannot meet the actual use requirements, thus affecting the effect of industrial quality inspection.

SUMMARY

The present invention provides the following technical schemes for solving the problem of insufficient definition of a defective picture generated in the related art.

An embodiment of the first aspect of the present invention provides a defective picture generation method applied to industrial quality inspection, which includes: acquiring a first workpiece picture set with defects and a second workpiece picture set without defects; determining a defect annotation picture corresponding to each first workpiece picture in the first workpiece picture set, and storing the defect annotation pictures in a defect feature database; determining a feature value of each second workpiece picture in the second workpiece picture set, and storing the feature values in a picture feature database; training a pix2pixHD network based on the first workpiece pictures, the second workpiece pictures, the defect annotation pictures and the feature values to obtain a trained generator of the pix2pixHD network; acquiring a desired defect type and a desired picture type; acquiring a target defect annotation picture from the defect feature database according to the desired defect type; acquiring a target feature value from the picture feature database according to the desired picture type; and inputting the target defect annotation picture and the target feature value into the trained generator to cause the trained generator to generate a target defective picture.

In addition, the defective picture generation method applied to industrial quality inspection according to the above embodiment of the present invention may further have the following additional technical features.

According to an embodiment of the present invention, the determining a defect annotation picture corresponding to each first workpiece picture in the first workpiece picture set includes: cropping the first workpiece picture to obtain a defective picture corresponding to the first workpiece picture; and annotating the defective picture corresponding to the first workpiece picture according to a defect type to generate a defect annotation picture corresponding to the first workpiece picture.

According to an embodiment of the present invention, the determining a feature value of each second workpiece picture in the second workpiece picture set includes: clustering the second workpiece pictures to obtain a picture type of each of the second workpiece pictures; and generating a feature value of the second workpiece picture according to the picture type of the second workpiece picture.

According to an embodiment of the present invention, the training a pix2pixHD network based on the first workpiece picture, the second workpiece picture, the defect annotation picture and the feature value to obtain a trained generator of the pix2pixHD network includes the following steps: step I, preprocessing the defect annotation picture to obtain a preprocessed defect annotation picture; step II, inputting the feature value and the preprocessed defect annotation picture into a generator of the pix2pixHD network to cause the generator to generate a false defective picture; step III, inputting the false defective picture and the second workpiece picture into a constructed visual geometry group (VGG) network, so that the VGG network extracts features of the false defective picture and the second workpiece picture, and calculates a perceptual reconstruction loss function value of the VGG network; step IV, inputting the first workpiece picture, the false defective picture and the second workpiece picture into a discriminator of the pix2pixHD network, and calculating an adversarial loss function value and a matching loss function value of the pix2pixHD network; step V, calculating a total loss function value according to the perceptual reconstruction loss function value, the adversarial loss function value and the matching loss function value; step VI, fixing parameters of the generator, and training parameters of the discriminator by repeatedly executing step II to step V until the total loss function value is maximized; and step VII, fixing the parameters of the discriminator, and training the parameters of the generator by repeatedly executing step II to step V until the total loss function value is minimized to obtain the trained generator.

According to an embodiment of the present invention, the preprocessing the defect annotation picture includes: performing at least one of brightness processing, definition processing, noise processing and picture enhancement processing on the defect annotation picture; and adjusting a size of the defect annotation picture to a fixed size.

According to one embodiment of the present invention, the perceptual reconstruction loss function of the VGG network is:

$$L_{PR}(G(x), y) = \sum_{i=1}^{S} \frac{1}{M_i}[\|F^{(i)}(y) - (G(x, E(x)))\|_1]$$

wherein $L_{PR}(G(x),y)$ represents the perceptual reconstruction loss function, G represents the generator, G(x) represents an output of the generator, x represents the false defective picture, y represents the second workpiece picture without defects, i represents a number of layers of the VGG network, S represents a total number of layers of the VGG network, $M_i$ represents a number of elements in the $i^{th}$ layer, $F^{(i)}$ is a feature vector of the $i^{th}$ layer, and E(x) is a desired value obtained based on x.

According to one embodiment of the present invention, the matching loss function of the pix2pixHD network is:

$$L_{FM}(G, D_k) = E_{(x,y)} \sum_{j=1}^{T} \frac{1}{N_j}[\|D_k^{(j)}(x, y) - D_k^{(j)}(x, G(x, E(x)))\|_1]$$

wherein $L_{FM}(G,D_k)$ represents the matching loss function, D represents the discriminator, $D_k$ represents the $k^{th}$ stage of the discriminator, $E_{(x,y)}$ represents a desired distribution of x and y, j represents the number of layers of the discriminator, T represents the total number of layers of the discriminator, $N_j$ represents the number of elements in the $j^{th}$ layer, and $D_k^{(j)}$ represents a feature vector of the $j^{th}$ layer of the $k^{th}$ stage of the discriminator.

According to one embodiment of the present invention, the total loss function is:

$$\min_G \left( \left( \max_{D_1,D_2} \sum_{k=1,2} L_{GAN}(G, D_k) + \lambda_{FM} \sum_{k=1,2} L_{FM}(G, D_k) + \lambda_{PR} L_{PR}(G(x), E(x)), y \right) \right)$$

wherein $D_1$ represents the first stage of the discriminator, $D_2$ represents the second stage of the discriminator, $L_{GAN}(G,D_k)$ represents the adversarial loss function, $L_{FM}(G,D_k)$ represents the matching loss function, $\lambda_{FM}$ is the weight of the matching loss function, and $\lambda_{PR}$ is the weight of the perceptual reconstruction loss function.

An embodiment of the second aspect of the present invention provides a defective picture generation apparatus applied to industrial quality inspection, which includes: a first acquisition module configured to acquire a first workpiece picture set with defects and a second workpiece picture set without defects; a first determination module configured to determine a defect annotation picture corresponding to each first workpiece picture in the first workpiece picture set, and store the defect annotation pictures in a defect feature database; a second determination module configured to determine a feature value of each second workpiece picture in the second workpiece picture set, and store the feature values in a picture feature database; a training module configured to train a pix2pixHD network based on the first workpiece pictures, the second workpiece pictures, the defect annotation pictures and the feature values to obtain a trained generator of the pix2pixHD network; a second acquisition module configured to acquire a desired defect type and a desired picture type; a third acquisition module configured to acquire a target defect annotation picture from the defect feature database according to the desired defect type; a fourth acquisition module configured to acquire a target feature value from the picture feature database according to the desired picture type; and a generation module configured to input the target defect annotation picture and the target feature value into the trained generator to cause the trained generator to generate a target defective picture.

In addition, the defective picture generation apparatus applied to industrial quality inspection according to the above embodiment of the present invention may further have the following additional technical features.

According to an embodiment of the present invention, the training module includes: a processing unit configured to preprocess the defect annotation picture to obtain a preprocessed defect annotation picture; a generation unit configured to input the feature value and the preprocessed defect annotation picture into a generator of the pix2pixHD network to cause the generator to generate a false defective picture; a first input unit configured to input the false defective picture and the second workpiece picture into a constructed VGG network, so that the VGG network extracts features of the false defective picture and the second workpiece picture, and calculates a perceptual reconstruction loss function value of the VGG network; a second input unit configured to input the first workpiece picture, the false defective picture and the second workpiece picture into a discriminator of the pix2pixHD network, and calculate an adversarial loss function value and a matching loss function value of the pix2pixHD network; a calculation unit configured to calculate a total loss function value according to the perceptual reconstruction loss function value, the adversarial loss function value and the matching loss function value; a first training unit configured to fix parameters of the generator, and train parameters of the discriminator until the total loss function value is maximized; and a second training unit configured to fix parameters of the discriminator, and train parameters of the generator until the total loss function value is minimized to obtain the trained generator.

According to the technical schemes of the embodiments of the present invention, the pix2pixHD network is obtained by model training, and the defective pictures meeting the requirement are generated according to a generator of the pix2pixHD network. Therefore, high-precision defective pictures may be generated, the requirement on the definition of the defective pictures in industrial quality inspection is met, and the efficiency of the industrial quality inspection is improved.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention, and not all of them. Based on the embodiments in the present invention, all other embodiments obtained by those of ordinary skill in the art without creative work shall fall within the protection scope of the present invention.

Specific embodiments of the present invention will be described below with reference to the drawings.

Figure 1:
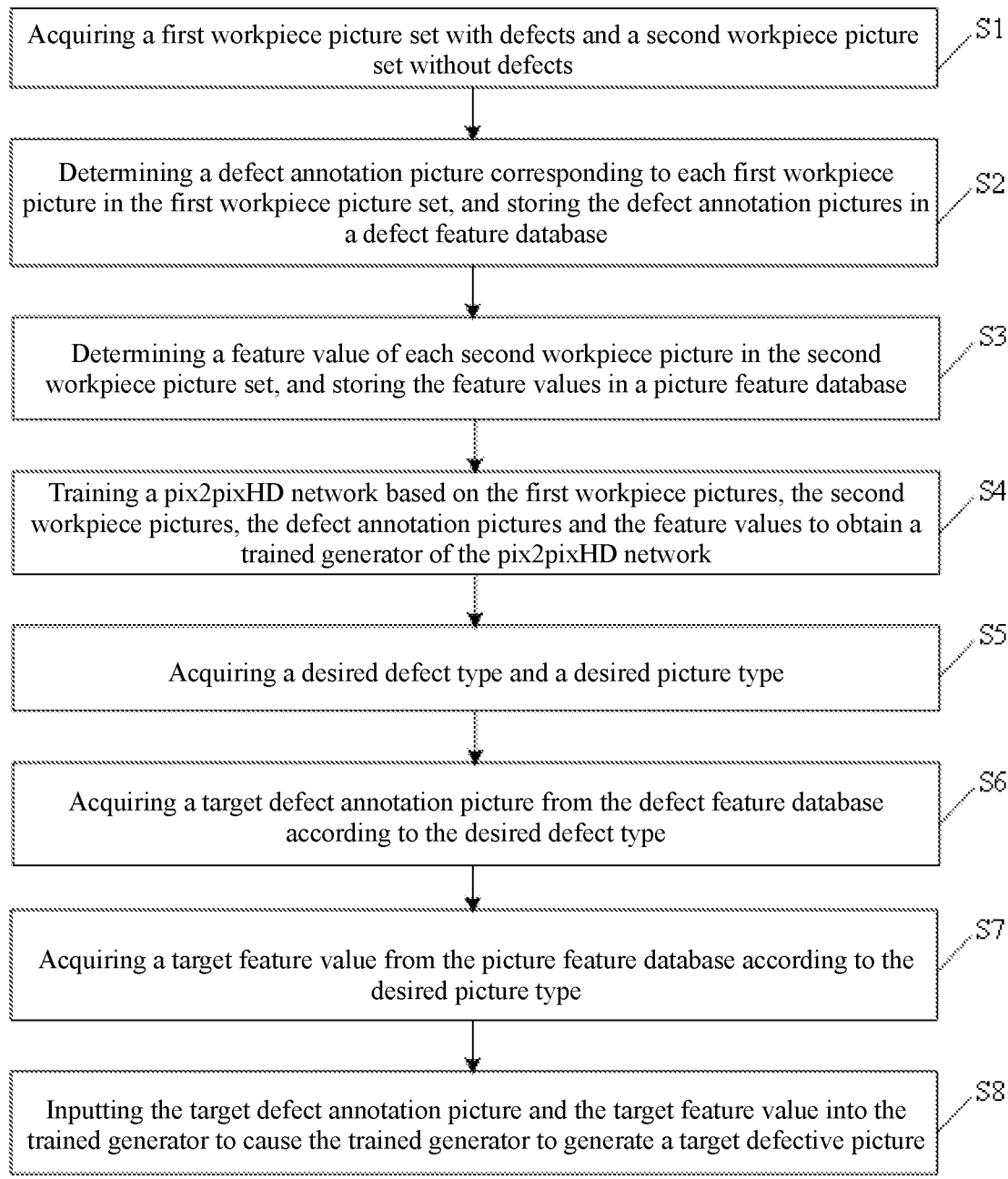
FIG. 1 is a flowchart of a defective picture generation method applied to industrial quality inspection according to an embodiment of the present invention.

FIG. 1 is a flowchart of a defective picture generation method applied to industrial quality inspection according to an embodiment of the present invention.

It should be noted that the execution subject of the defective picture generation method applied to industrial quality inspection according to an embodiment of the present invention may be an electronic device in an industrial field, and specifically, the electronic device may be, but is not limited to, an industrial computer, a mobile terminal, and the like. The application scenario of the embodiment of the present invention may be a scenario where a workpiece needs to be subjected to quality inspection, such as an industrial production site, wherein the workpiece may be an industrial object, such as an industrial computer and a tire.

As shown in FIG. 1, the defective picture generation method applied to industrial quality inspection includes the following steps S1 to S8.

S1, acquiring a first workpiece picture set with defects and a second workpiece picture set without defects.

It should be noted that, in the embodiment of the present invention, a workpiece picture with defects is referred to as a first workpiece picture, and a workpiece picture without defects is referred to as a second workpiece picture.

Specifically, a plurality of first workpiece pictures and a plurality of second workpiece pictures may be obtained in any feasible manner in the related art, wherein the plurality of first workpiece pictures constitute a first workpiece picture set, the plurality of second workpiece pictures constitute a second workpiece picture set, and the first workpiece picture set and the second workpiece picture set are used as sample pictures for training a pix2pixHD network.

S2, determining a defect annotation picture corresponding to each first workpiece picture in the first workpiece picture set, and storing the defect annotation pictures in a defect feature database.

The defect annotation picture may be understood as a picture including only defective parts carrying annotations, wherein the annotations may be used to characterize the type of the defects, such as dimples and scratches.

Specifically, each first workpiece picture may be cropped according to the features to obtain the defective part in the first workpiece picture, and the defective part may be named and labeled according to the type of the defective part to obtain the defect annotation picture. A defect feature database may be created, and the defect annotation pictures with names and labels are stored in the defect feature database, so that subsequent calling is facilitated, and the defect annotation picture may be used as a defective part in the picture when a defective picture is generated subsequently.

S3, determining a feature value of each second workpiece picture in the second workpiece picture set, and storing the feature values in a picture feature database.

The feature value may be understood as a feature vector that characterizes a type of the second workpiece picture, and may be a one-dimensional vector or a multi-dimensional vector.

Specifically, the picture type of the second workpiece picture may be determined, the feature value corresponding to the second workpiece picture is further determined according to the picture type, after the feature value of each second workpiece picture is obtained, the picture feature database may be created, and each feature value is stored into the picture feature database, so that subsequent calling is facilitated, and the feature value may be used as a background feature of the picture when the defective picture is generated subsequently.

S4, training a pix2pixHD network based on the first workpiece pictures, the second workpiece pictures, the defect annotation pictures and the feature values to obtain a trained generator of the pix2pixHD network.

Specifically, after the defect annotation picture of the first workpiece picture and the feature value of the second workpiece picture are obtained, the pix2pixHD network may be trained and obtained, and after the training is completed, a trained generator and a trained discriminator may be obtained. The basic neural network structure of the generator is a multi-level network, and the multi-level network includes a global picture generation network and a local fuzzy-to-high-definition conversion network; and the discriminator of the pix2pixHD network is a multi-scale discriminator.

S5, acquiring a desired defect type and a desired picture type.

It should be noted that the embodiment of the present invention is intended to generate a defective picture that meets use requirements, a type of a defect in the defective picture that is desired to be generated may be referred to as a desired defect type, and a picture type of the defective picture that is desired to be generated may be referred to as a desired picture type.

Specifically, when a defective picture needs to be generated, a desired defect type and a desired picture type may be generated according to the instruction of a user or the requirement of industrial quality inspection.

S6, acquiring a target defect annotation picture from the defect feature database according to the desired defect type.

S7, acquiring a target feature value from the picture feature database according to the desired picture type.

Specifically, after the desired defect type and the desired picture type are obtained, a defect annotation picture corresponding to the desired defect type is selected from the defect feature database created in step S2, wherein the defect annotation picture is a target defect annotation picture of the defective picture that needs to be generated; a feature value corresponding to the desired picture type may also be selected from the picture feature database created in step S3, wherein the feature value is a target feature value of the defective picture that needs to be generated.

S8, inputting the target defect annotation picture and the target feature value into the trained generator to cause the trained generator to generate a target defective picture.

Figure 2:
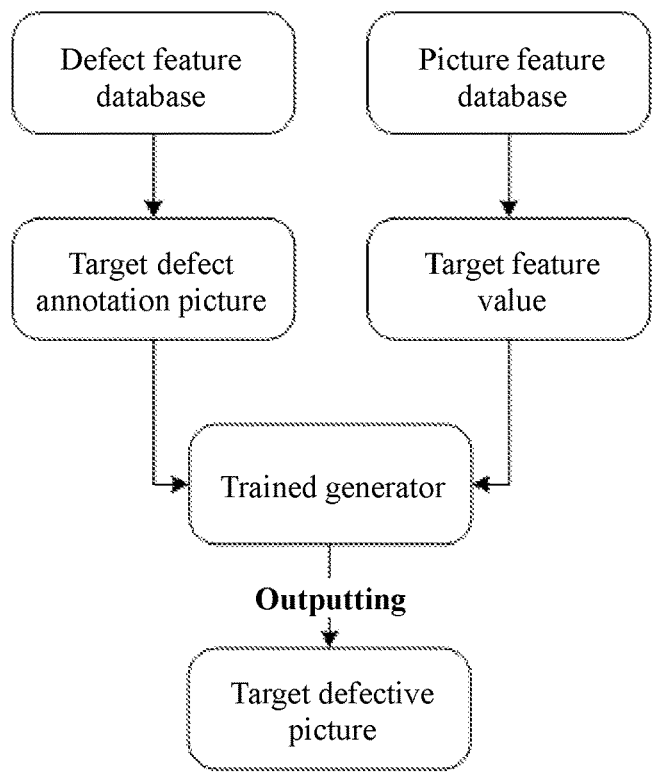
FIG. 2 is a schematic diagram of a process of generating a target defective picture by using a trained generator according to an embodiment of the present invention.

Specifically, as shown in FIG. 2, after a pix2pixHD network is trained and the target defect annotation picture and the target feature value are acquired, the target defect annotation picture is inputted to a trained generator of the pix2pixHD network as a defect feature of a picture to be generated, the target feature value is inputted to the trained generator of the pix2pixHD network as a type of the picture to be generated, and the trained generator performs inference calculation according to the input to output a target defective picture corresponding to the target defect annotation picture and the target feature value, so as to achieve the generation of the target defective picture.

That is, in the embodiment of the present invention, a generator of a pix2pixHD network is adopted to generate a required defective picture, wherein the pix2pixHD network is trained according to a first workpiece picture set with defects and a second workpiece picture set without defects, the pix2pixHD network adopts a multi-scale discriminator to perform picture discrimination, and distinguishes real pictures and synthesized pictures at a plurality of different scales, and the generator of the pix2pixHD network adopts a multi-level network to facilitate generation of high-definition pictures, thereby achieving the generation of high-resolution and high-quality pictures.

In the defective picture generation method applied to industrial quality inspection according to an embodiment of the present invention, the pix2pixHD network is obtained by model training, and the defective pictures meeting the requirement are generated according to a generator of the pix2pixHD network. Therefore, high-precision defective pictures may be generated, the requirement on the definition of the defective pictures in industrial quality inspection is met, and the efficiency of the industrial quality inspection is improved.

In an embodiment of the present invention, the above step S2 may include: cropping the first workpiece picture to obtain a defective picture corresponding to the first workpiece picture; annotating the defective picture corresponding to the first workpiece picture according to a defect type to generate a defect annotation picture corresponding to the first workpiece picture; and storing the defect annotation pictures in a defect feature database.

It may be understood that the first workpiece picture includes a defective part and a background part, and in the embodiment of the present invention, the defective part and the background part in the first workpiece picture may be separated from each other through the cropping process, so as to obtain a separate defective part, which may be referred to as a defective picture.

Specifically, the defective part in the first workpiece picture may be cropped out to obtain a defective picture, and then the corresponding defective picture may be annotated according to the type of the defect (e.g., dimples and scratches); the name and the label of each defective picture may be annotated specifically, and the defective picture with the name and the label may be referred to as a defect annotation picture. After the defect annotation picture is obtained, the defect annotation picture may be stored in a defect feature database, and may also be stored in a certain path, so that the defect type is subjected to standardization processing, and the calling when generating pictures in the future is facilitated.

In an embodiment of the present invention, the above step S3 may include: clustering the second workpiece pictures to obtain a picture type of each second workpiece picture; generating a feature value of the second workpiece picture according to the picture type of the second workpiece picture; and storing the feature values in the picture feature database.

Specifically, the second workpiece pictures may be divided into one corresponding picture type through cluster analysis, and when the division is performed, each second workpiece picture corresponds to one picture type, and one picture type corresponds to at least one second workpiece picture. Then, corresponding feature values may be generated according to the picture type corresponding to the second workpiece picture, the feature values may be sequentially numbered and then stored in the picture feature database, and the feature values may be selected according to the numbers subsequently.

In an embodiment of the present invention, the above step S4 may include the following step I to step VII.

Step I, preprocessing the defect annotation picture to obtain a preprocessed defect annotation picture.

The preprocessing the defect annotation picture may include: performing at least one of brightness processing, definition processing, noise processing and picture enhancement processing on the defect annotation picture; and adjusting a size of the defect annotation picture to a fixed size.

Specifically, the defect annotation picture may be subjected to some changes in brightness, changes in definition, and random addition of some noise. Meanwhile, in order to increase the sample size, the defect annotation picture may be randomly subjected to picture enhancement processing such as rotation or inversion.

When network training is performed, all pictures to be inputted are kept in a uniform fixed size; in order to prevent training errors caused by inconsistent sizes of the inputted pictures, the sizes of the defect annotation pictures may be adjusted to be uniform before the samples are inputted.

Step II, inputting the feature value and the preprocessed defect annotation picture into a generator of the pix2pixHD network to cause the generator to generate a false defective picture.

Step III, inputting the false defective picture and the second workpiece picture into a constructed VGG network, so that the VGG network extracts features of the false defective picture and the second workpiece picture, and calculates a perceptual reconstruction loss function value of the VGG network.

Step IV, inputting the first workpiece picture, the false defective picture and the second workpiece picture into a discriminator of the pix2pixHD network, and calculating an adversarial loss function value and a matching loss function value of the pix2pixHD network.

Step V, calculating a total loss function value according to the perceptual reconstruction loss function value, the adversarial loss function value and the matching loss function value.

Step VI, fixing parameters of the generator, and training parameters of the discriminator by repeatedly executing step II to step V until the total loss function value is maximized.

Step VII, fixing the parameters of the discriminator, and training the parameters of the generator by repeatedly executing step II to step V until the total loss function value is minimized to obtain the trained generator.

Figure 3:
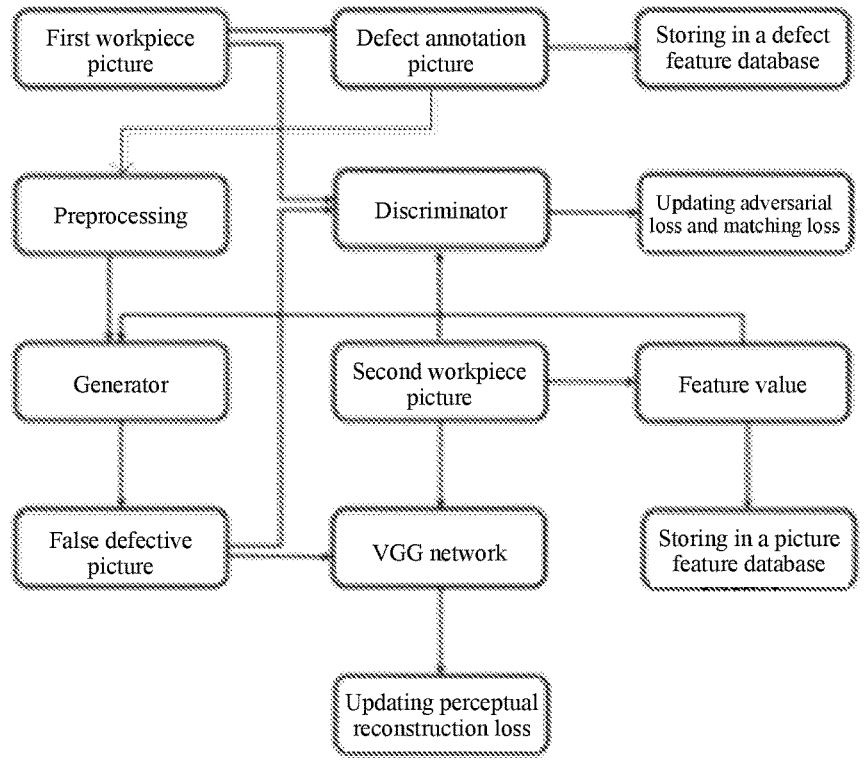
FIG. 3 is a schematic diagram of a process of training a pix2pixHD network according to an embodiment of the present invention.

Specifically, as shown in FIG. 3, for the obtained defect annotation picture, firstly, the defect annotation picture is preprocessed, then the feature value of the second workpiece picture and the preprocessed defect annotation picture are inputted into the generator of the pix2pixHD network, and then the generator outputs the feature value and the false defective picture corresponding to the preprocessed defect annotation picture, and the false defective picture and the second workpiece picture are inputted into the constructed VGG network, and then the VGG network is subjected to feature extraction, and the perceptual reconstruction function value of the VGG network may be calculated by the following formula:

$$L_{PR}(G(x), y) = \sum_{i=1}^{S} \frac{1}{M_i} [\|F^{(i)}(y) - (G(x, E(x)))\|_1]$$

wherein $L_{PR}(G(x),y)$ represents the perceptual reconstruction loss function, G represents the generator, G(x) represents an output of the generator, x represents the false defective picture, y represents the second workpiece picture without defects, i represents a number of layers of the VGG network, S represents a total number of layers of the VGG network, $M_i$ represents a number of elements in the $i^{th}$ layer, $F^{(i)}$ is a feature vector of the $i^{th}$ layer, and E(x) is a desired value obtained based on x. In the training process, stability in the training process may be improved by calculating the perceptual reconstruction loss function.

Then, the first workpiece picture with defects, the false defective picture and the second workpiece picture without defects are inputted into a discriminator of the pix2pixHD network, and the adversarial loss function value of the pix2pixHD network may be calculated by the following formula:

$$L_{GAN}(G,D_k)=E_k(x,y)[\log D_k(x,y)]+E_{(x)}[\log(1-D_k(x,E(x)))]$$

wherein $L_{GAN}(G,D_k)$ represents the adversarial loss function, $E_{(x,y)}$ represents the desired distribution of x and y, and $D_k$ represents the $k^{th}$ stage of the discriminator.

The matching loss function value of the pix2pixHD network may be calculated by the following formula:

$$L_{FM}(G, D_k) = E_{(x,y)} \sum_{j=1}^{T} \frac{1}{N_j} [\|D_k^{(j)}(x, y) - D_k^{(j)}(x, G(x, E(x)))\|_1]$$

wherein $L_{FM}(G,D_k)$ represents the matching loss function, D represents the discriminator, $D_k$ represents the $k^{th}$ stage of the discriminator, $E_{(x,y)}$ represents a desired distribution of x and y, j represents the number of layers of the discriminator, T represents the total number of layers of the discriminator, $N_j$ represents the number of elements in the $j^{th}$ layer, and $D_k$ represents a feature vector of the $j^{th}$ layer of the $k^{th}$ stage of the discriminator.

Then a total loss function value may be calculated according to the perceptual reconstruction loss function, the adversarial loss function and the matching loss function by the following formula:

$$\min_G \left( \left( \max_{D_1,D_2} \sum_{k=1,2} L_{GAN}(G, D_k) + \lambda_{FM} \sum_{k=1,2} L_{FM}(G, D_k) + \lambda_{PR} L_{PR}(G(x), E(x)), y \right) \right)$$

wherein $D_1$ represents the first stage of the discriminator, $D_2$ represents the second stage of the discriminator, $L_{GAN}(G,D_k)$ represents the adversarial loss function, $L_{FM}(G,D_k)$ represents the matching loss function, $\lambda_{FM}$ is the weight of the matching loss function, $\lambda_{PR}$ is the weight of the perceptual reconstruction loss function, and the weights of the matching loss and the perceptual reconstruction loss may be determined by giving different values. The number of discriminators in the pix2pixHD network may be determined according to the scale of the discriminators.

When the pix2pixHD network is trained, the discriminator is firstly trained and then the generator is trained, which specifically includes: fixing the parameters of the generator, repeatedly executing step II to step V, wherein after step V is executed each time, whether the total loss function value is maximized is determined, if so, it is indicated that the training of the discriminator is completed, then fixing the parameters of the trained discriminator, and repeatedly executing step II to step V, wherein after step V is executed each time, whether the total loss function value is minimized is determined, if so, it is indicated that the training of the generator is completed, thereby completing the training of the pix2pixHD network.

Figure 4:
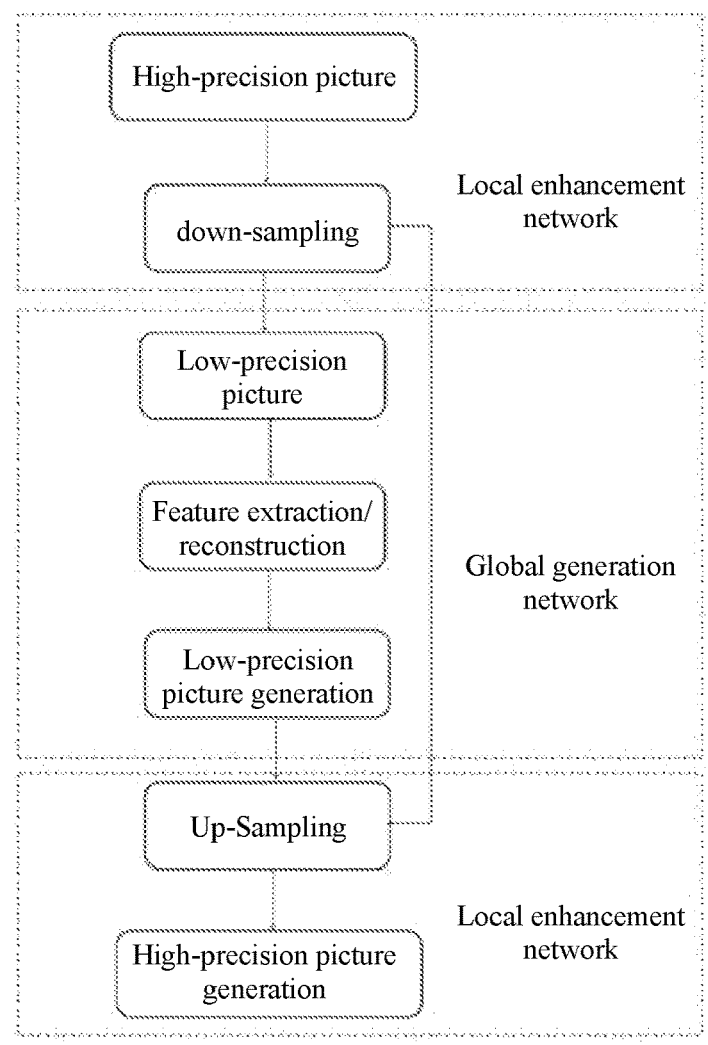
FIG. 4 is a schematic structural diagram of a generator according to an embodiment of the present invention.

As shown in FIG. 4, the generator is constituted by a head local enhancement network, a tail local enhancement network and a middle global generation network, wherein the head local enhancement network is configured to down-sample the picture, that is, a high-resolution picture is down-sampled to a low-resolution picture; the global generation network is configured to perform feature extraction and reconstruction on the low-resolution picture; and the tail local enhancement network is configured to perform up-sampling processing, that is, the low-resolution picture is restored into the high-definition picture through up-sampling.

In the training process of the generator, the head local enhancement network and the tail local enhancement network are firstly fixed, and the middle global generation network is intensively trained; and then the global generation network is fixed, and the head local enhancement network and the tail local enhancement network are trained. The performance of the enhancement network may be effectively improved by this training method, and the generation of the high-precision pictures may be ensured.

After the training is completed, model parameters of the generator are stored, and the generator which is independent is used as a tool for generating defective pictures subsequently.

In summary, the GAN technique is unstable and prone to fail in the process of generating defective pictures for industrial quality inspection model training. Especially when a higher resolution is desired for the generated picture, the defective picture generated by GAN cannot ensure a clear texture. The fuzzy defective picture cannot meet the requirements of industrial detection model training. By the technical schemes of the embodiment of the present invention, the high-precision picture may be generated, and meanwhile, the stability of the generation process may be ensured.

Corresponding to the defective picture generation method applied to the industrial quality inspection according to the above embodiment, the present invention further provides a defective picture generation apparatus applied to industrial quality inspection.

Figure 5:
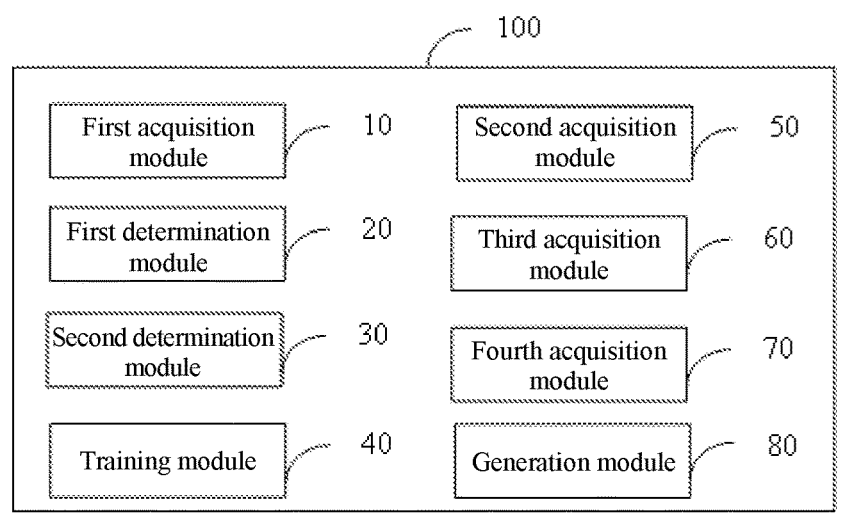
FIG. 5 is a schematic block diagram of a defective picture generation apparatus applied to industrial quality inspection according to an embodiment of the present invention.

FIG. 5 is a schematic block diagram of a defective picture generation apparatus applied to industrial quality inspection according to an embodiment of the present invention.

As shown in FIG. 5, the defective picture generation apparatus 100 applied to industrial quality inspection includes: a first acquisition module 10, a first determination module 20, a second determination module 30, a training module 40, a second acquisition module 50, a third acquisition module 60, a fourth acquisition module 70 and a generation module 80.

The first acquisition module 10 is configured to acquire a first workpiece picture set with defects and a second workpiece picture set without defects; the first determination module 20 is configured to determine a defect annotation picture corresponding to each first workpiece picture in the first workpiece picture set, and store the defect annotation pictures in a defect feature database; the second determination module 30 is configured to determine a feature value of each second workpiece picture in the second workpiece picture set, and store the feature values in a picture feature database; the training module 40 is configured to train a pix2pixHD network based on the first workpiece pictures, the second workpiece pictures, the defect annotation pictures and the feature values to obtain a trained generator of the pix2pixHD network; a second acquisition module 50 is configured to acquire a desired defect type and a desired picture type; the third acquisition module 60 is configured to acquire a target defect annotation picture from the defect feature database according to the desired defect type; the fourth acquisition module 70 is configured to acquire a target feature value from the picture feature database according to the desired picture type; and the generation module 80 is configured to input the target defect annotation picture and the target feature value into the trained generator to cause the trained generator to generate a target defective picture.

In an embodiment of the present invention, the first determination module 20 is specifically configured to: crop the first workpiece picture to obtain a defective picture corresponding to the first workpiece picture; and annotate the defective picture corresponding to the first workpiece picture according to the defect type to generate a defect annotation picture corresponding to the first workpiece picture.

In an embodiment of the present invention, the second determination module 30 is specifically configured to: cluster the second workpiece pictures to obtain a picture type of each second workpiece picture; and generate a feature value of the second workpiece picture according to the picture type of the second workpiece picture.

In an embodiment of the present invention, the training module 40 may include: a processing unit configured to preprocess the defect annotation picture to obtain a preprocessed defect annotation picture; a generation unit configured to input the feature value and the preprocessed defect annotation picture into a generator of the pix2pixHD network to cause the generator to generate a false defective picture; a first input unit configured to input the false defective picture and the second workpiece picture into a constructed VGG network, so that the VGG network extracts features of the false defective picture and the second workpiece picture, and calculates a perceptual reconstruction loss function value of the VGG network; a second input unit configured to input the first workpiece picture, the false defective picture and the second workpiece picture into a discriminator of the pix2pixHD network, and calculate an adversarial loss function value and a matching loss function value of the pix2pixHD network; a calculation unit configured to calculate a total loss function value according to the perceptual reconstruction loss function value, the adversarial loss function value and the matching loss function value; a first training unit configured to fix parameters of the generator, and train parameters of the discriminator until the total loss function value is maximized; and a second training unit configured to fix parameters of the discriminator, and train parameters of the generator until the total loss function value is minimized to obtain the trained generator.

In an embodiment of the present invention, the processing unit is specifically configured to: perform at least one of brightness processing, definition processing, noise processing and picture enhancement processing on the defect annotation picture; and adjust a size of the defect annotation picture to a fixed size.

In an embodiment of the present invention, the perceptual reconstruction loss function of the VGG network is:

$$L_{PR}(G(x), y) = \sum_{i=1}^{S} \frac{1}{M_i} [\|F^{(i)}(y) - (G(x, E(x)))\|_1]$$

wherein $L_{PR}(G(x),y)$ represents the perceptual reconstruction loss function, G represents the generator, G(x) represents an output of the generator, x represents the false defective picture, y represents the second workpiece picture without defects, i represents a number of layers of the VGG network, S represents a total number of layers of the VGG network, $M_i$ represents a number of elements in the $i^{th}$ layer, $F^{(i)}$ is a feature vector of the $i^{th}$ layer, and E(x) is a desired value obtained based on x.

In an embodiment of the present invention, the matching loss function of the pix2pixHD network is:

$$L_{FM}(G, D_k) = E_{(x,y)} \sum_{j=1}^{T} \frac{1}{N_j} [\|D_k^{(j)}(x, y) - D_k^{(j)}(x, G(x, E(x)))\|_1]$$

wherein $L_{FM}(G,D_k)$ represents the matching loss function, D represents the discriminator, $D_k$ represents the $k^{th}$ stage of the discriminator, $E_{(x,y)}$ represents a desired distribution of x and y, j represents the number of layers of the discriminator, T represents the total number of layers of the discriminator, $N_j$ represents the number of elements in the $j^{th}$ layer, and $D_k^{(j)}$ represents a feature vector of the $j^{th}$ layer of the $k^{th}$ stage of the discriminator.

In an embodiment of the present invention, the total loss function is:

$$\min_{G} \left(\left(\max_{D_1, D_2} \sum_{k=1,2} L_{GAN}(G, D_k) + \lambda_{FM} \sum_{k=1,2} L_{FM}(G, D_k) + \lambda_{PR} L_{PR}(G(x), E(x)), y\right)\right)$$

wherein $D_1$ represents the first stage of the discriminator, $D_2$ represents the second stage of the discriminator, $L_{GAN}(G,D_k)$ represents the adversarial loss function, $L_{FM}(G,D_k)$ represents the matching loss function, $\lambda_{FM}$ is the weight of the matching loss function, and $\lambda_{PR}$ is the weight of the perceptual reconstruction loss function.

It should be noted that, for the specific implementation and implementation principle of the defective picture generation apparatus applied to industrial quality inspection, reference may be made to the specific implementation of the defective picture generation method applied to industrial quality inspection, and details are not described herein for avoiding redundancy.

In the defective picture generation apparatus applied to industrial quality inspection according to an embodiment of the present invention, the pix2pixHD network is obtained by model training, and the defective pictures meeting the requirement are generated according to a generator of the pix2pixHD network. Therefore, the defective picture with high definition may be generated, the requirement of industrial quality inspection is met, and the efficiency of industrial quality inspection is improved.

In the description of the present application, the terms "first" and "second" are only for the purpose of description, and may not be construed as indicating or implying the relative importance or implicitly specifying the number of technical features indicated. Thus, features defined by "first" and "second" may explicitly or implicitly include one or more of the feature. The "plurality" means two or more, unless otherwise specifically defined.

As described herein, reference to the description of "one embodiment", "some embodiments", "an example", "a specific example" or "some examples" or the like is intended to mean that a specific feature, structure, material, or characteristic described in connection with the embodiment or example is included in at least one embodiment or example of the present invention. In the present specification, the schematic representations of the above terms do not necessarily refer to the same embodiment or example. Furthermore, the specific features, structures, materials or characteristics described may be combined in a suitable manner in any one or more embodiments or examples. Moreover, various embodiments or examples and the features of various embodiments or examples described in the present specification may be combined and connected by those skilled in the art without conflict.

Any process or method descriptions in the flowcharts or otherwise described herein may be understood as representing modules, segments, or parts of code which include one or more executable instructions for implementing specific logical functions or steps of the process, and the scope of the preferred embodiments of the present invention includes other implementations in which functions may be performed out of the order shown or discussed, including substantially concurrently or in reverse order, depending on the functionality involved, as would be understood by those skilled in the art to which embodiments of the present invention belong.

It should be understood that parts of the present invention may be implemented in hardware, software, firmware, or a combination thereof. In the above embodiments, various steps or methods may be implemented in software or firmware stored in a memory and executed by a suitable instruction execution system. For example, if implemented in hardware, as in another embodiment, any one or a combination of the following technologies, which are well known in the art, may be used: a discrete logic circuit having a logic gate circuit for implementing a logic function on a data signal, an application specific integrated circuit having an appropriate combinational logic gate circuit, a programmable gate array (PGA), a field programmable gate array (FPGA), and the like.

Those of ordinary skill in the art can understand that all or part of the steps carried in the method of the above-described embodiments can be implemented by a program instructing relevant hardware. The program can be stored in a computer-readable storage medium, and the program, when executed, includes one of the steps of the method of the embodiments or a combination thereof. In addition, the functional units in the embodiments of the present invention may be integrated into one processing module, or each unit may exist alone physically, or two or more units are integrated into one module. The integrated module can be achieved in the form of hardware, and can also be achieved in the form of a software functional module. If the integrated module is implemented in the form of a software functional module and is sold or used as a separate product, it may also be stored in a computer-readable storage medium.

Although the embodiments of the present invention have been shown and described above, it will be understood that the above embodiments are exemplary and not to be construed as limiting the present invention, and that Those of ordinary skill in the art can make variations, modifications, substitutions and alterations within the scope of the present invention.

What is claimed is:

1. A defective picture generation method applied to an industrial quality inspection, comprising:
    acquiring a first workpiece picture set with defects and a second workpiece picture set without defects;
    determining a defect annotation picture corresponding to each first workpiece picture in the first workpiece picture set, and storing the defect annotation pictures in a defect feature database;
    determining a feature value of each second workpiece picture in the second workpiece picture set, and storing the feature values in a picture feature database;
    training a pix2pixHD network based on the first workpiece pictures, the second workpiece pictures, the defect annotation pictures and the feature values to obtain a trained generator of the pix2pixHD network;
    acquiring a desired defect type and a desired picture type;
    acquiring a target defect annotation picture from the defect feature database according to the desired defect type;
    acquiring a target feature value from the picture feature database according to the desired picture type; and
    inputting the target defect annotation picture and the target feature value into the trained generator to cause the trained generator to generate a target defective picture.

2. The defective picture generation method applied to the industrial quality inspection according to claim 1, wherein the step of determining the defect annotation picture corresponding to each first workpiece picture in the first workpiece picture set comprises:
    cropping the first workpiece picture to obtain a defective picture corresponding to the first workpiece picture; and
    annotating the defective picture corresponding to the first workpiece picture according to a defect type to generate a defect annotation picture corresponding to the first workpiece picture.

3. The defective picture generation method applied to the industrial quality inspection according to claim 1, wherein the step of determining the feature value of each second workpiece picture in the second workpiece picture set comprises:

clustering the second workpiece pictures to obtain a picture type of each of the second workpiece pictures; and generating a feature value of the second workpiece picture according to the picture type of the second workpiece picture.

4. The defective picture generation method applied to the industrial quality inspection according to claim 1, wherein the step of training the pix2pixHD network based on the first workpiece picture, the second workpiece picture, the defect annotation picture and the feature value to obtain the trained generator of the pix2pixHD network comprises the following steps:

step I, preprocessing the defect annotation picture to obtain a preprocessed defect annotation picture;

step II, inputting the feature value and the preprocessed defect annotation picture into a generator of the pix2pixHD network to cause the generator to generate a false defective picture;

step III, inputting the false defective picture and the second workpiece picture into a constructed VGG network, so that the VGG network extracts features of the false defective picture and the second workpiece picture, and calculates a perceptual reconstruction loss function value of the VGG network;

step IV, inputting the first workpiece picture, the false defective picture and the second workpiece picture into a discriminator of the pix2pixHD network, and calculating an adversarial loss function value and a matching loss function value of the pix2pixHD network;

step V, calculating a total loss function value according to the perceptual reconstruction loss function value, the adversarial loss function value and the matching loss function value;

step VI, fixing parameters of the generator, and training parameters of the discriminator by repeatedly executing step II to step V until the total loss function value is maximized; and step VII, fixing the parameters of the discriminator, and training the parameters of the generator by repeatedly executing step II to step V until the total loss function value is minimized to obtain the trained generator.

5. The defective picture generation method applied to the industrial quality inspection according to claim 4, wherein the step of preprocessing the defect annotation picture comprises:

performing at least one of brightness processing, definition processing, noise processing and picture enhancement processing on the defect annotation picture; and adjusting a size of the defect annotation picture to a fixed size.

6. The defective picture generation method applied to the industrial quality inspection according to claim 4, wherein the perceptual reconstruction loss function of the VGG network is:

$$L_{PR}(G(x), y) = \sum_{i=1}^{S} \frac{1}{M_i} [\|F^{(i)}(y) - (G(x, E(x)))\|_1]$$

wherein $L_{PR}(G(x),y)$ represents the perceptual reconstruction loss function, G represents the generator, G(x) represents an output of the generator, x represents the false defective picture, y represents the second workpiece picture without defects, i represents a number of layers of the VGG network, S represents a total number of layers of the VGG network, $M_i$ represents a number of elements in an $i^{th}$ layer, $F^{(i)}$ is a feature vector of the $i^{th}$ layer, and E(x) is a desired value obtained based on x.

7. The defective picture generation method applied to the industrial quality inspection according to claim 6, wherein a matching loss function of the pix2pixHD network is:

$$L_{FM}(G, D_k) = E_{(x,y)} \sum_{j=1}^{T} \frac{1}{N_j} [\|D_k^{(j)}(x, y) - D_k^{(j)}(x, G(x, E(x)))\|_1]$$

wherein $L_{FM}(G,D_k)$ represents the matching loss function, D represents the discriminator, $D_k$ represents a $k^{th}$ stage of the discriminator, $E_{(x,y)}$ represents a desired distribution of x and y, j represents a number of layers of the discriminator, T represents a total number of layers of the discriminator, $N_j$ represents a number of elements in a $j^{th}$ layer, and DO represents a feature vector of the $j^{th}$ layer of the $k^{th}$ stage of the discriminator.

8. The defective picture generation method applied to the industrial quality inspection according to claim 7, wherein a total loss function is:

$$\min_G \left( \left( \max_{D_1, D_2} \sum_{k=1,2} L_{GAN}(G, D_k) + \lambda_{FM} \sum_{k=1,2} L_{FM}(G, D_k) + \lambda_{PR} L_{PR}(G(x, E(x)), y) \right) \right)$$

wherein $D_1$ represents a first stage of the discriminator, $D_2$ represents a second stage of the discriminator, $L_{GAN}(G,D_k)$ represents an adversarial loss function, $L_{FM}(G, D_k)$ represents the matching loss function, $\lambda_{FM}$ is a weight of the matching loss function, and $\lambda_{PR}$ is a weight of the perceptual reconstruction loss function.

9. A defective picture generation apparatus applied to an industrial quality inspection, comprising:

a first acquisition module configured to acquire a first workpiece picture set with defects and a second workpiece picture set without defects;

a first determination module configured to determine a defect annotation picture corresponding to each first workpiece picture in the first workpiece picture set and store the defect annotation pictures in a defect feature database;

a second determination module configured to determine a feature value of each second workpiece picture in the second workpiece picture set and store the feature values in a picture feature database;

a training module configured to train a pix2pixHD network based on the first workpiece pictures, the second workpiece pictures, the defect annotation pictures and the feature values to obtain a trained generator of the pix2pixHD network;

a second acquisition module configured to acquire a desired defect type and a desired picture type;

a third acquisition module configured to acquire a target defect annotation picture from the defect feature database according to the desired defect type;

a fourth acquisition module configured to acquire a target feature value from the picture feature database according to the desired picture type; and a generation module configured to input the target defect annotation picture and the target feature value into the trained generator to cause the trained generator to generate a target defective picture.

10. The defective picture generation apparatus applied to the industrial quality inspection according to claim 9, wherein the training module comprises:

a processing unit configured to preprocess the defect annotation picture to obtain a preprocessed defect annotation picture;

a generation unit configured to input the feature value and the preprocessed defect annotation picture into a generator of the pix2pixHD network to cause the generator to generate a false defective picture;

a first input unit configured to input the false defective picture and the second workpiece picture into a constructed VGG network, so that the VGG network extracts features of the false defective picture and the second workpiece picture, and calculates a perceptual reconstruction loss function value of the VGG network;

a second input unit configured to input the first workpiece picture, the false defective picture and the second workpiece picture into a discriminator of the pix2pixHD network, and calculate an adversarial loss function value and a matching loss function value of the pix2pixHD network;

a calculation unit configured to calculate a total loss function value according to the perceptual reconstruction loss function value, the adversarial loss function value and the matching loss function value;

a first training unit configured to fix parameters of the generator, and train parameters of the discriminator until the total loss function value is maximized; and a second training unit configured to fix the parameters of the discriminator, and train the parameters of the generator until the total loss function value is minimized to obtain the trained generator.

* * * * *